United States Patent

Sandel et al.

[11] Patent Number: 5,129,871
[45] Date of Patent: Jul. 14, 1992

[54] NONSYNCHRONOUS FIVE-SPEED TRANSAXLE HAVING BIDIRECTIONAL COUPLING

[75] Inventors: Joseph L. Sandel, Dearborn Heights; Richard A. Snyder, South Lyon, both of Mich.; Clinton F. Justice, Fort Wayne, Ind.

[73] Assignee: Ford Motor Company, Dearborn, Mich.

[21] Appl. No.: 772,312

[22] Filed: Oct. 7, 1991

[51] Int. Cl.⁵ .............................................. F16H 57/10
[52] U.S. Cl. ..................................... 475/297; 475/271; 475/281; 475/312; 192/45; 192/48.92; 192/44
[58] Field of Search .............. 475/271, 281, 283, 285, 475/287, 288, 289, 291, 292, 297, 312, 318, 324; 192/45, 48.8, 48.9, 48.92, 44

[56] References Cited

U.S. PATENT DOCUMENTS

| | | | |
|---|---|---|---|
| 2,251,464 | 8/1941 | Neracher et al. | 475/312 X |
| 2,504,173 | 4/1950 | Banker | 192/45 |
| 2,792,714 | 5/1957 | Forster | 475/289 X |
| 3,537,554 | 11/1970 | Elmore et al. | 192/45 |
| 4,086,827 | 5/1978 | Chana | 475/281 |
| 4,368,649 | 1/1983 | Vahratian et al. | 475/66 |
| 4,418,585 | 12/1983 | Pierce | 475/281 X |
| 4,455,890 | 5/1984 | Kuramochi et al. | 475/312 X |
| 4,509,389 | 4/1985 | Vahratian et al. | 475/66 |
| 4,989,704 | 2/1991 | Morishita et al. | 192/45 |

Primary Examiner—Richard Lorence
Assistant Examiner—William O. Trousdell
Attorney, Agent, or Firm—Frank G. McKenzie; Roger L. May

[57] ABSTRACT

A shaft connected to a component of a planetary gearset is driveably connected by a coupling to alternate friction elements in accordance with the relative speeds of the coupling members and the direction of rotation of the driven coupling member. The coupling includes a radially inner one-way coupling and an outer one-way coupling, the outer race of the inner coupling and inner race of the outer coupling being the intermediate race, which is connected to the gearset. The inner race and outer race have cam surfaces contacting roller clutch elements located in a cage and spaced mutually about the coupling axis. The cam surfaces of the races are inclined with respect to the adjacent surface of the intermediate race in opposite directions, so that when one coupling drives, the other coupling overruns.

12 Claims, 4 Drawing Sheets

| GEAR | CC | 4B | DC | 5B | RC | FC | 2B | L/R | OWC4 | OWC3 | OWC2 | OWC1 | OWC4 | OWC3 | OWC2 | OWC1 |
|------|----|----|----|----|----|----|----|-----|------|------|------|------|------|------|------|------|
|      |    |    |    |    |    |    |    |     | DRIVE |     |      |      | COAST |     |      |      |
| 1M   | X  |    |    |    |    |    |    | X   |      |      | X    | X    |      |      |      | O/R  |
| 1    |    |    |    |    |    | X  |    |     |      |      | X    | X    |      |      | O/R  | O/R  |
| 2M   | X  | X  |    |    |    | X  | X  |     | X    |      | X    | O/R  | O/R  |      |      | O/R  |
| 2    |    |    | X  |    |    | X  | X  |     | X    |      | X    | O/R  | O/R  |      | O/R  | O/R  |
| 3M   | X  |    | X  |    |    | X  | X  |     | O/R  | X    | X    | O/R  | X    | X    | O/R  | O/R  |
| 3    |    |    | X  |    |    | X  | X  |     | O/R  | X    | X    | O/R  |      | O/R  | O/R  | O/R  |
| 4M   |    | X  | X  |    |    | X  |    |     |      | O/R  | O/R  | O/R  |      | O/R  | O/R  | O/R  |
| 4    |    | X  | X  |    |    | X  |    |     |      | O/R  | O/R  | O/R  |      | O/R  | O/R  | O/R  |
| 5    |    | X  |    | X  |    |    |    |     |      |      | O/R  | O/R  |      |      | O/R  | O/R  |
| R    |    |    |    |    | X  |    |    | X   | X    |      |      |      | O/R  |      |      |      |

FIG. 3

NONSYNCHRONOUS FIVE-SPEED TRANSAXLE HAVING BIDIRECTIONAL COUPLING

BACKGROUND OF THE INVENTION

1. Field of the Invention

This invention relates to a planetary gearing mechanism for an automatic transmission, and to the clutches and brakes used to control its operation. The invention pertains to a component of such a mechanism that is held or driveably connected to other clutches and brakes by operation of an overrunning coupling having bidirectional driving and overrunning characteristics.

2. Description of the Prior Art

The length of the space available to locate components of a transaxle is limited by the available distance between the driven wheels. This length, extending along the axle parallel to the engine crankshaft, is directed transversely to the longitudinal vehicle axis and is restricted in front-wheel-drive vehicles.

Various arrangements of clutches, brakes and one-way clutches are used in the prior art to control operation of dual interconnected planetary gear units to produce forward speed ratios and a reverse drive ratio in an automatic transmission.

U.S. Pat. No. 4,418,585 has clutches and brakes arranged so that a gear ratio change from the lowest speed to the second speed is made nonsynchronously, i.e., by transferring torque from an overrunning coupling to a friction clutch. In that transmission, a gear shift from the second speed to the third speed requires disengagement of the brake band and application of a clutch. A gear ratio change from the third speed to the fourth or overdrive speed also requires disengagement of a brake band and engagement of a friction clutch. In the operation of the transmission, none of the gear shifts require synchronous disengagement of a clutch and engagement of another clutch. Therefore, timing problems in the engagement and release of the clutch brake control servos are eliminated.

The transmission according to the '585 patent requires time for disengagement of a high speed ratio clutch and application of a friction brake in order to produce the ratio change from the third forward speed to the fourth overdrive speed.

U.S. Pat. No. 4,368,649 describes a four-speed transaxle that overcomes this difficulty. In the transaxle of the '649 patent the gear shift from the third speed to the fourth speed results by applying a single friction brake in addition to the other friction elements engaged during the third speed ratio. A gear shift from the first speed to the second forward speed results merely by engaging a second friction clutch while a companion friction clutch remains applied. In this way, a ratio change from the first ratio and from the third ratio in the forward driving speed range results merely by engaging or disengaging a single friction element, either a clutch or a brake, thereby greatly simplifying control of the clutches and eliminating potential for harsh or abrupt gear shift changes.

U.S. Pat. No. 4,509,389 describes a further improvement that eliminates a latent difficulty in control of the transmission of the '649 patent that makes calibration of the two-three upshift difficult. The sun gear is not connected to a friction clutch cylinder but is connected instead to the inner race of an associated one-way clutch. The inner races of each one-way coupling are connected to a common member, which operates as a torque delivery element for the input sun gear of the planetary gear. The maximum speed of the friction clutch cylinders is equal to the speed of the driven sprocket of a chain mechanism connecting the output of a torque converter to the input shaft of the transmission.

U.S. Pat. No. 4,086,827 describes a four speed transmission in which a single one-way clutch is located in series between an input friction clutch and a gear member of a planetary gear set. The one-way clutch permits the gear member to overrun the input during an overdrive ratio so that an upshift from the third speed to the fourth speed results without a synchronous release of the input friction clutch. To produce a downshift from the fourth speed to the second or third speeds, the input increases to the speed of the gear member by engagement of the one-way clutch when a friction brake or another friction clutch is released.

The present invention reduces, in comparison to techniques in the prior art, the axial length along the axle shaft required for multiple one-way couplings used to control operation of a planetary gearset in an automatic transaxle for motor vehicles.

The present invention provides for five forward speeds and a reverse drive ratio, and is an improvement over the four speed transaxle described in U.S. Ser. No. 739,641 filed Aug. 2, 1991, assigned to the assignee of this invention.

SUMMARY OF THE INVENTION

This invention is applicable as a two-axis transaxle having a hydrokinetic torque converter mounted on an axis concentric with the engine crankshaft and parallel to the axis of the multiple speed gearing. The transaxle produces two underspeed ratios, a direct drive ratio, two overspeed ratios and a reverse drive ratio.

The automatic transaxle of this invention produces five forward speed ranges and a reverse drive. Because of the unique arrangement of the clutch, brakes and one-way couplings, the transaxle is extremely compact and its weight is low. The compactness of the transaxle is the result of use of certain components of the transaxle for multiple purposes to produce multiple speed ratios. For example, the structure that provides the gearset reaction force through a one-way coupling in intermediate speed ranges, the second and third speed ratios, is used also to transmit torque converter turbine torque in the reverse drive condition.

The torsional path between the engine and the planetary gear in the reverse drive condition is through a reverse friction clutch and a cylinder or drum that provides a surface engaged by an intermediate brake band and the friction plate of the reverse friction clutch. This use of the shell or drum for multiple purposes eliminates the need for an additional component.

A one-way coupling, located between the gear units and engine, overruns in the reverse coast condition. The engine is driveably disconnected from the wheels and therefore unavailable to impede vehicle movement. This avoids abrupt unexpected changes in acceleration when the operator changes from drive to coast conditions in the reverse range.

The transmission includes three planetary gear units each including a sun gear, a ring gear, a carrier and planetary pinions rotatably supported on the carrier and meshing with the sun gear and ring gear. The carrier of the first gear unit is fixed to the ring gear of the second gear unit and is driveably connected as the output from the gearing to the sun gear of a final drive planetary gearset that drives a differential mechanism.

The carrier of the second gear unit is connected to the ring gear of the first gear unit and to the inner race of a one-way brake fixed to the transmission casing. The sun gears of the second and third gear units are connected mutually and to two one-way couplings, each coupling fixed to a respective brake. The carrier of the third gear unit is releasably connected to a brake.

Parallel torque delivery paths between the ring gear of the first planetary gear unit and a low reverse brake drum comprise a one-way coupling and a forward clutch in parallel with a coast clutch, which provides a torque reaction that bypasses the one-way clutch during a coast condition.

The clutches and brakes of the transaxle are arranged so that the gear ratio change from the lowest speed to the second speed results by transferring torque from a one-way brake to a intermediate brake band. A gear ratio change from the second speed to the third speed results when a direct clutch is engaged and while the brake band continues to be applied. A gear ratio change from the third speed to the fourth speed results by applying an overdrive brake, a friction member, while maintaining engagement of the direct clutch. An upshift to fifth speed from fourth speed result by engaging a fifth speed brake while maintaining engaged the friction elements that produce fourth speed. Therefore, no ratio change requires synchronous disengagement of a friction element and application of another friction element. Because of this feature, timing problems in the engagement and release of friction clutches and brakes and control servos are eliminated.

The bidirectional coupling of this invention includes first and second one-way couplings that alternately connect or release friction elements and a shaft that carries the compound sun gears. That shaft is fixed to an intermediate race located between an inner race, associated with the first coupling, and an outer race, associated with the second coupling.

When the sun gears counter-rotate relative to the inner race, the inner coupling connects the sun gear shaft to a drum, which is engageable by various brakes and clutches. When the drum rotates relative to the shaft in the direction of the engine shaft, the inner coupling connects the drum to the compound sun gears. Otherwise the inner coupling overruns.

When the sun gears rotate relative to the outer race in the direction of the engine shaft, the outer coupling connects the compound sun gears to a friction brake. When the sun gears counter-rotate relative to the outer race, the outer coupling overruns.

BRIEF DESCRIPTION OF THE DRAWINGS

FIG. 3 is a chart that shows a schedule of engagement and disengagement of clutches, couplings and brakes and to establish the forward drive ratios and reverse drive of the transaxle of FIG. 2.

DESCRIPTION OF THE PREFERRED EMBODIMENT

Figure 1:
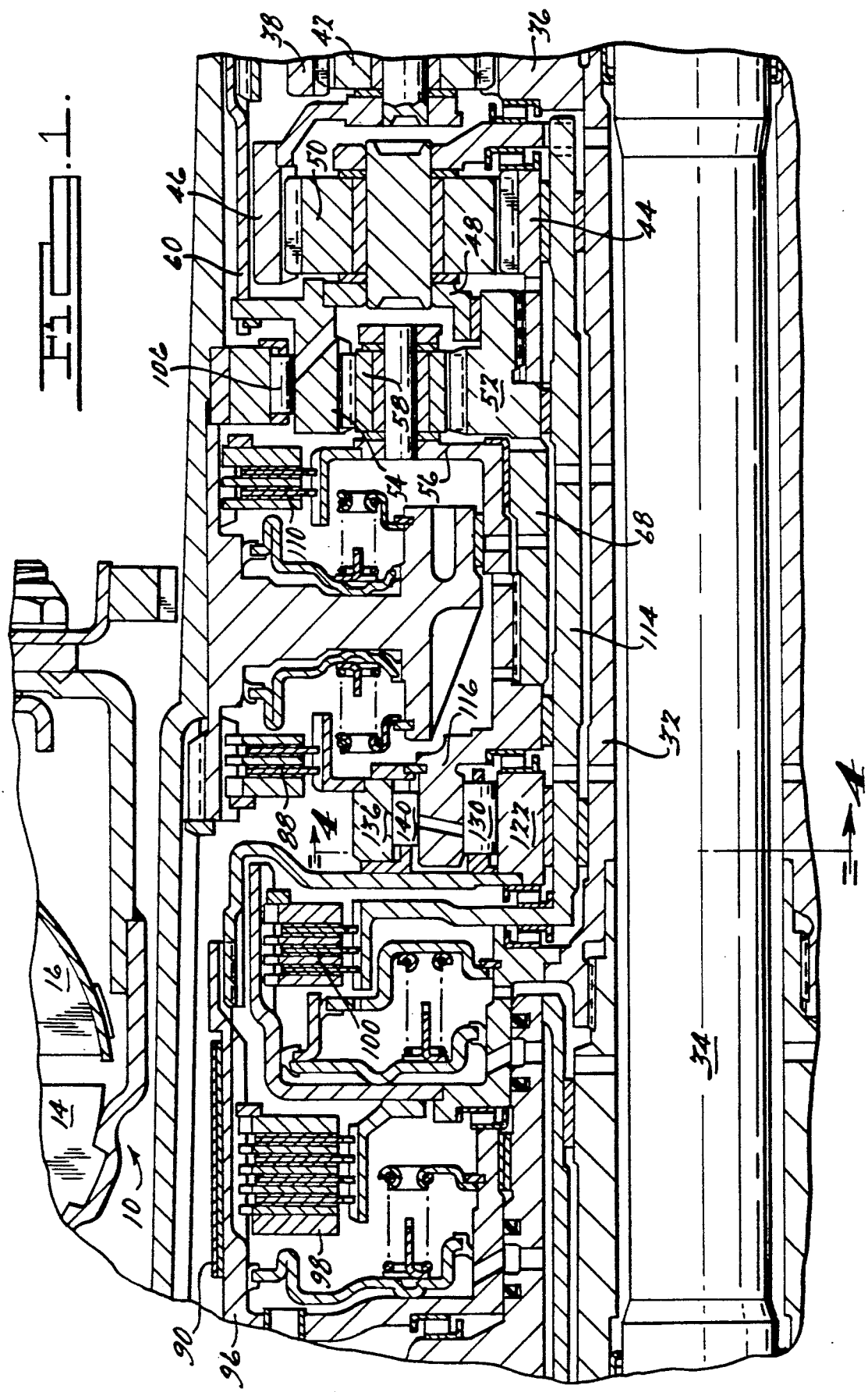
FIG. 1 is a cross section taken along the axis of the input and output shafts showing various friction clutches and brakes, and a multi-directional one-way coupling.
Figure 2:
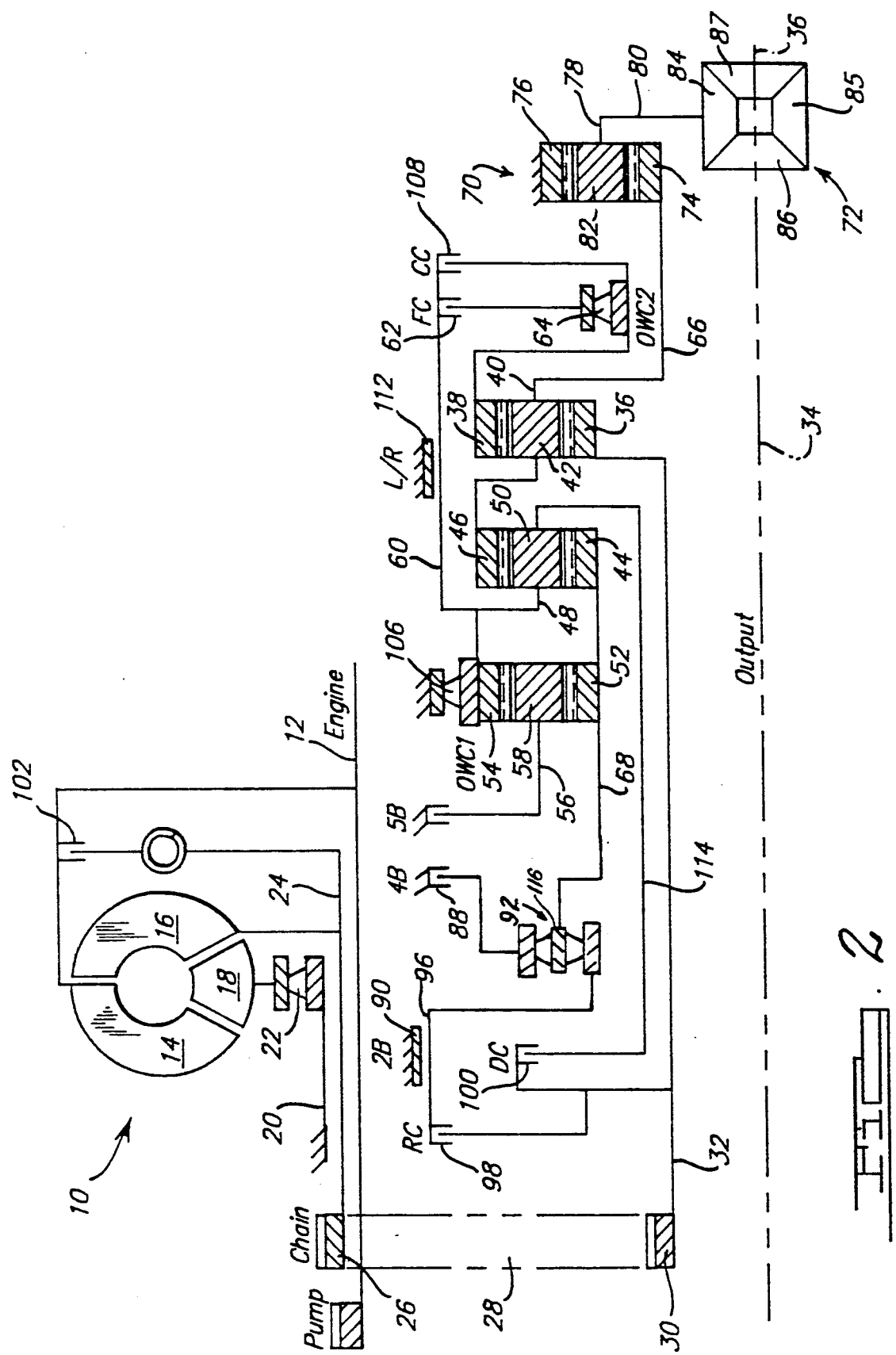
FIG. 2 is a schematic diagram showing planetary gearing, clutches, brakes, couplings, torque converter, chain drive mechanism, final gearing and a differential mechanism.

Referring first to FIGS. 1 and 2, a hydrokinetic torque converter 10 is driveably connected to an internal combustion engine having a crankshaft 12 connected to a bladed impeller 14 of the torque converter. A bladed turbine 16, a bladed stator 18, and the impeller 14 define a toroidal fluid flow circuit within the casing of the torque converter. The stator 18 is supported on a stationary sleeve shaft 20, and a overrunning brake 22 anchors the stator to shaft 20 to prevent rotation of stator 18 in a direction opposite to the direction of rotation of the impeller, although free-wheeling motion in the opposite direction is permitted.

Turbine 16 is connected to turbine sleeve shaft 24, which drives the torque input sprocket wheel 26. Sprocket wheel 26 is part of an input torque transfer drive that includes also drive chain 28 and driven sprocket wheel 30, which is mounted for rotation about the torque input sleeve shaft 32. Axle shifts 34, 36 are concentric with the axis of input shaft 32.

Planetary gearing includes three simple planetary gear units. The first gear unit includes a sun gear 36, ring gear 38, carrier 40 and planetary pinions 42, supported by carrier 40 in meshing engagement with sun gear 36 and ring gear 38. The second planetary gear unit includes a sun gear 44, a ring gear 46, carrier 48 and planet pinions 50, supported by carrier 48 in meshing engagement with sun gear 44 and ring gear 46. The third gear unit includes a sun gear 52, a ring gear 54, a carrier 56 and planet pinions 58, supported by carrier 56 in meshing engagement with sun gear 52 and ring gear 54. Carrier 48 and ring gear 54 are connected mutually, and they are connected to ring gear 38 by a drum 60, forwardclutch 67 and a one-way coupling 64, also identified as OWC2. Ring gear 46 is connected to carrier 40 and to torque output shaft 66. Sun gears 44, 52 are connected mutually by shaft 68.

A final drive planetary gearset 70 is located in a torque delivery path between output shaft 66 and a differential gear unit 72, to which axle shafts 34 and 36 are connected. Gear unit 70 includes sun gear 74, connected to output shaft 66; ring gear 62, permanently fixed to the transmission casing; a carrier 78, connected to the spindle 80 of the differential mechanism 72; and planet pinions 82, rotatably supported on carrier 78 in engagement with sun gear 74 and ring gear 76. Differential gear unit 72 has bevel pinions 84, 85, which mesh with bevel side gears 86, 87, connected respectively to axle shafts 34, 36.

Sprocket wheel 30, connected to sleeve shaft 32, is connected directly to sun gear 36 of the first planetary gear unit. Sun gears 44, 52 of the second and third gear units are releasably connectable to the transmission casing through bidirectional coupling 92 and brake 88, which carries also the symbol 4B. Sun gears 44, 52 are releasably connected to the casing also through bidirectional coupling 92 and brake 90, which also carries the symbol 2B. Shaft 68 is connected driveably to brake 88, through operation of one-way coupling OWC3 located at the radially outer portion of coupling 92, or to brake 89, through operation of one-way coupling OWC4 located at the radially inner portion of coupling 92, depending on the directional sense of the drive and the relative speeds of the driving and driven components of the coupling.

The outer torsional member of reverse clutch 98 (RC) is connected to drum 96, and the inner member of the reverse clutch is directly connected to input shaft 32 and to the outer member of direct clutch 100 (DC). Carrier 48 of the second gear unit is selectively connected to input shaft 32 through direct clutch 100.

The torque converter includes a lockup clutch 102, located within the torque converter and impeller housing. The torque output side of the lockup clutch has a damper 104 located between the impeller and the turbine sleeve shaft 24 so that engagement of the lockup clutch will not be accompanied by harshness due to transitional torque fluctuations.

The inner race of a one-way or overrunning brake (OWC1) 106 is directly connected to carrier 48 and drum 60; the outer race of brake 106 is fixed permanently against rotation to the transmission casing. The inner race of one-way clutch 64 is connected to ring gear 38, and its outer race is connected to one element of forward clutch 62. Couplings 64, 92 and one-way brake 106 are roller-type overrunning couplings generally having an outer cam with an inclined surface driveably connected to, and released from the inner race by a roller in accordance with the speed of rotation of the inner race relative to the outer race. Brake 110 (5B), a friction disc brake, holds carrier 56 against rotation by connecting it to the casing when the brake is engaged and releases carrier 56 when disengaged.

The inner race of one-way coupling 64 is also connected to an element of coast clutch 108 (CC), the other component of the coast clutch being connected to drum 60.

Friction elements 62, 88, 98, 100, 108, 110 are hydraulically actuated clutches and brakes of the type having multiple friction discs supported rotatably on one member of the friction element and a second set of friction discs interposed between the members of the first friction disc set and supported rotatably on the other member of the friction element. When hydraulic pressure is applied to the friction element, the discs are brought into mutual frictional contact and the friction element transmits torque between its members. When the magnitude of hydraulic pressure supplied to the friction elements is reduced, a spring disengages the discs and the friction element is thereafter unable to transmit torque.

A low/reverse brake band 112 selectively engages drum 60 in low speed manual and reverse drive conditions. Brake band 90, 112 are actuated by hydraulic servos, which contract the corresponding brake band into engagement with the respective drums 60, 96 and release this engagement when the corresponding servo is vented.

FIG. 6 shows a chart indicating the clutches and brakes that are engaged and released selectively to produce each of the various forward drive ratios and the reverse ratio. In the chart, the symbol X is used to identify an engaged clutch or brake, the symbol O/R is used to designate an overrunning condition for couplings or brakes 52, 84, 96, and a blank is used with respect to columns entitled "OWC1", "OWC2" and "OWC3" and "OWC4" to indicate a one-way coupling or brake that is neither overrunning nor driving.

In operation with the gear selector in the "D" or "OD" position, to establish automatically the lowest forward speed ratio, forward clutch 62 is applied, one-way clutch 64 drives, and one-way brake 106 connects drum 60 and carrier 48 to the transmission casing. When the forward clutch is engaged, ring gear 38 is fixed to the transmission casing against rotation, thereby providing the gearset reaction, and sun gears 44, 52 counter-rotate. Engine torque then is transmitted hydrodynamically through the torque converter, and transfer drive chain 28 to sprocket wheel 30, input shaft 32, and sun gear 36. Carrier 40 of the first planetary gear unit drives output shaft 66, and the axle shafts 34, 36 are driven through final drive gear set 70 and differential unit 72. Shaft 68 drives the inner coupling of bidirection coupling 92 opposite the direction of input shaft 32; therefore, the inner race of the inner coupling and drum 96 counter-rotate.

When operating in the D-range under a coast condition, one-way brake 106 and one-way clutch 64 overrun.

When first gear is selected manually by the operator by placing the gear shift lever in the 1M-range position, coast clutch 108 and low reverse band 112 are applied. The torque delivery path from ring gear 38 through the coast clutch shunts the torque path that includes one-way coupling 64 and forward clutch 62. Therefore, in the drive condition, there are two parallel paths potentially providing a gearset reaction on the transmission casing to hold ring gear 38 against rotation. One path is through one-way coupling 64 and forward clutch 62, and one-way brake 106; the other path is through coast clutch 108 and reverse band 102. However, in the coast condition, couplings 64 and 106 are inoperative, and the reaction on the transmission casing that holds ring gear 38 is provided through the coast clutch and the low/reverse band.

The torque delivery path for the second forward speed in the D-range results when forward clutch 62 and brake band 90 are applied, couplings 64, 92 drive, and one-way brake 106 overruns. In this instance, sun gear 44 is held against rotation on the transmission casing by engagement of brake band 90 through operation of the radially inner coupling of bidirectional coupling 92. Torque from the engine is delivered to sun gear 36 and the output is taken at carrier 40, which is connected to output shaft 66. In the coast condition, all one-way couplings 64, 84 106 overrun; therefore, the output means comprising output shaft 66, carrier 40 and planet pinions 42 turn as a unit.

When the gear selector is set manually for operation in the 2M-range, coast clutch 108, forward clutch 62, friction brake 88 and brake band 90 are applied. During the drive condition in the 2M-range, couplings 64, 92 drive and one-way brake 106 overruns. In this instance, sun gear 44 is fixed against rotation on the transmission housing by engagement of the brake band 90, and ring gear 38 is driveably connected to carrier 48 of the second planetary gear unit through either the torque delivery path that includes coast clutch 108 or the parallel path that includes one-way coupling 64 and forward clutch 62. In the coast condition in the 2M-range, one-way brake 106 overruns and one-way couplings 64 and 94 are inoperative. Sun gear 44 is fixed to the transmission casing against rotation by brake 88. Ring gear 38 is connected to carrier 48 of the first planetary gear unit through the path that includes coast clutch 108 and drum 60. Sun gear 36 drives input shaft 32.

When the transmission operates in the third forward speed and the gear selector is in the D-range, where gearshifts are produced automatically, forward clutch 62 and brake band 90 remain engaged, direct clutch 100 is engaged and one-way coupling 62 drives. Brake 90 holds one member of the radially inner one-way coupling of bidirectional coupling 92, but shaft 68 overruns. Torque input from the engine is directed through the direct clutch and intermediate shaft 102, arranged concentrically with input shaft 32 and axle shaft 34, to carrier 48 of the second planetary gear unit. Carrier 48 drives ring gear 36 through drum 60, forward clutch 62 and one-way coupling 64. The torque output is taken by carrier 40 to output shaft 66.

During a coast condition in the third forward speed of the D-range, couplings 64, 92, 106 overrun and torque from output shaft 66 is transmitted through carrier 48 to ring gear 46, which is driveably connected by overrunning coupling 64 to input shaft 32.

With the transmission operating in the 3M-range forward clutch 62, coast clutch 108, direct clutch 100 and brake band 90 are applied. During a drive condition in that range, one-way coupling 64 drives. With the friction elements so engaged, the engine shaft 12 is driveably connected through the torque converter and chain drive to the input shaft 32, which is connected through direct clutch 100 to intermediate shaft 114, which drives carrier 48, the input member of the second planetary gear unit. Carrier 48 is connected through forward clutch 62 and one-way clutch 64 to ring gear 38. The third speed ratio is a direct drive ratio; therefore, the output unit, ring gear 46, carrier 40 and output shaft 66, turn at the speed of carrier 48 and ring gear 38.

During a coast condition in the 3M-range, one-way coupling 106 overruns, coupling 64 is inoperative, and the inner coupling of bidirectional coupling 92 overruns. Therefore, coast clutch 108 and drum 60 bypass the torque delivery path that includes forward clutch 62 and one-way coupling 64 to driveably connect ring gear 38 to carrier 48, thereby driving input shaft 32 at the speed of output shaft 66. Engagement of brake 82 assures that coupling 92 overruns.

The fourth forward speed, an overdrive ratio, is available when the gear selector is in the D-range or 4M-range. To produce the fourth speed ratio in the D-range, brake band 88, forward clutch 62 and direct clutch 100 are applied, one-way couplings 64 and 106 overrun, the radially outer one-way coupling of bidirectional coupling 92 connects shaft 68 to the casing, and the radial inner coupling is inoperative. Consequently, the engine shaft is connected through the torque converter, chain drive mechanism, input shaft 32, direct clutch 100 and intermediate shaft 114 to carrier 48, the input to the planetary gearing. Sun gear 44 is fixed against rotation on the transmission housing by engagement of friction brake 88. The output is ring gear 46, carrier 40 and output shaft 66, whose speed of rotation is multiplied through this arrangement in the second planetary gear unit only. The first gear unit is inoperative, although forward clutch 62 is engaged, because one-way coupling 64 overruns.

During the fourth speed coast condition in the D-range, couplings 64, 92, 106 overrun. Sun gear 44 is held against rotation by brake 88, and shaft 66 drives carrier 40 and ring gear 46. Carrier 48 is driveably connected to the sprocket wheel 30 of the chain drive mechanism through intermediate shaft 114, direct clutch 100 and input shaft 32.

During operation in the 4M-range, brake 88, direct clutch 100, and forward clutch 62 are engaged. Couplings 64, 106 overrun, but the outer one-way coupling of coupling 92 drives. Consequently, under drive conditions, sun gear 44 produces the gearset reaction because it is held on the casing through coupling 92 by engagement of brake 88. Carrier 48 is driven, but because coupling 64 overruns, the output is taken at ring gear 46, carrier 40 and shaft 62.

Under coast conditions in the 4M-range, shaft 66 drives carrier 40 and ring gear 46, but sun gear 44 is held against rotation by brake 88. Consequently carrier 48 drives intermediate shaft 114, which is connected to the engine through shaft 32, the direct clutch, and the chain drive mechanism.

The fifth speed is available only with the gear selector in the D-range. Fifth speed results when brakes 88 and 90, the direct clutch, and forward clutch are engaged. This causes couplings 64 and 106 to overrun, the inner coupling of bidirectional coupling 92 to counter-rotate with shaft 68 and drum 96, and carrier 56 to be held against rotation. Input shaft 66 drives carrier 48 and ring gear 54 through the direct clutch and intermediate shaft. Planet pinions 58 counterdrive sun gear 52 and drum 56 through coupling 92 because carrier 58 is held. Torque carried by compound sun gears 52 and 44 combine in the second gear unit to drive planet pinions 58, which also revolve due to the connection of carrier 48 to the input shaft. Ring gear 46, which is driven by carrier 48 and pinions 58, is connected to the output shaft by carrier 40. Ring gear 38 and the inner race of coupling 64 overrun.

When the transmission is disposed for reverse drive operation, input shaft 32 is driveably connected through reverse clutch 98, drum 96, coupling 92 and sleeve shaft 68 to compound sun gears 52 and 44, the input to the second planetary gear unit. Carrier 48 is fixed against rotation through engagement of low/reverse brake band 112. As a result of this engagement, ring gear 46 counterrotates and the output is taken on carrier 40 and output shaft 66. During the coast condition in the R-range, coupling 94 overruns, thereby driveably disconnecting sun gears 44 and 52 from input shaft 32 and from the engine.

Figure 4:
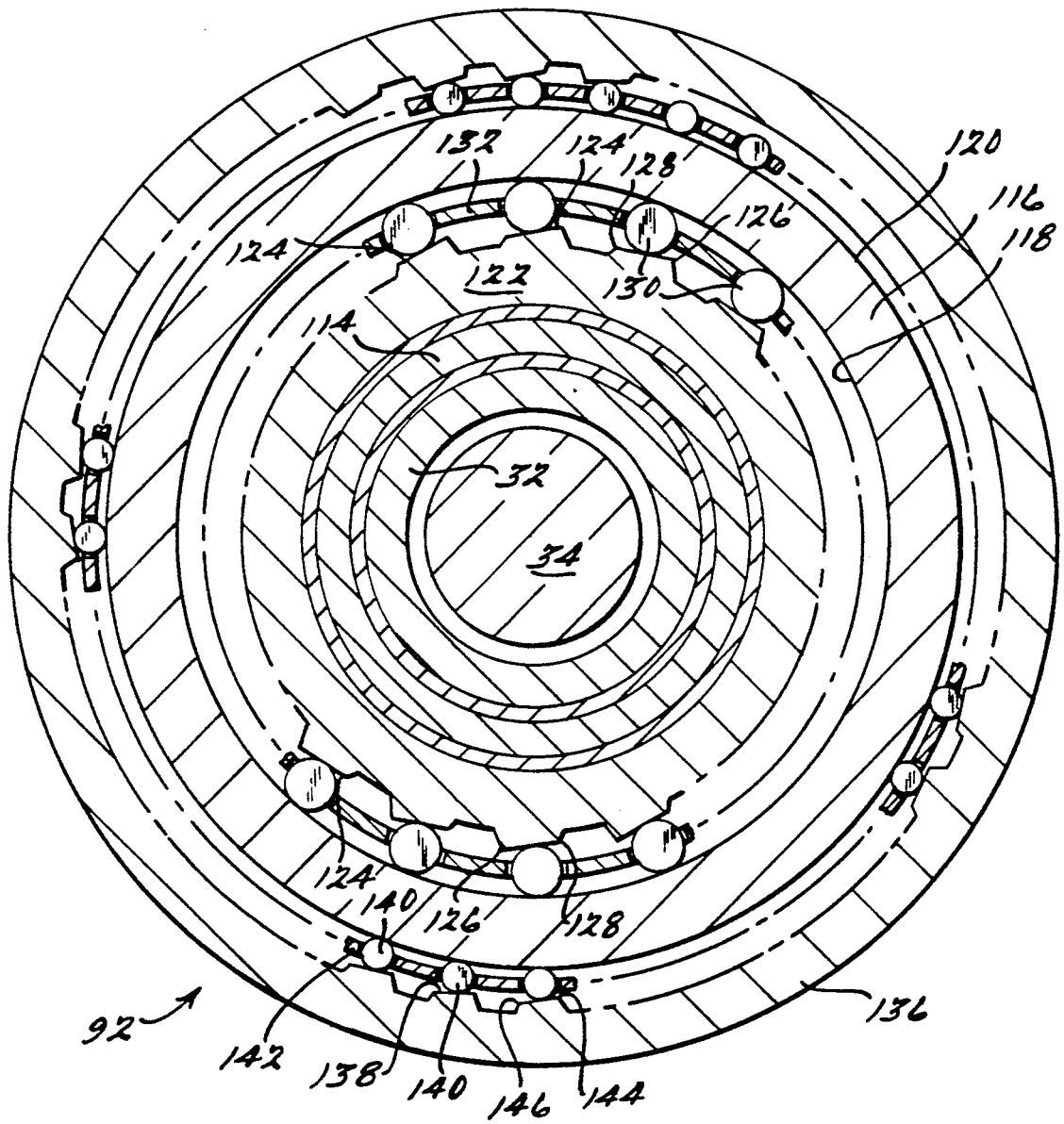
FIG. 4 is a cross section taken at plane 4—4 of FIG. 1.

Referring to FIG. 4, bidirectional coupling 92 is concentric with shaft 32 and includes an intermediate race 116 driveable connected to shaft 68 and having cylindrical inner and outer surfaces 118, 120. The radially inner one-way coupling includes an inner race 122 having multiple first cam surfaces 124 mutually spaced angularly about the axis of the coupling. Provision is made in FIG. 4 for sixteen equally spaced cam surfaces 124, each located radially closer to inner surface 118 at a first angular end 126 and radially farther from surface 118 at the opposite end 128. The cam surfaces may be planar or arcuate and are spaced radially from inner surface 118 sufficiently to permit a first set of cylindrical rollers 130 to fit between surfaces 118 and 124. Each roller is retained and spaced angularly from other rollers by a cage 132, which permits the rollers to move angularly relatively to the cam surfaces.

When the intermediate race counter-rotates relative to the inner race, i.e., turns clockwise as viewed in FIG. 4, the cam surfaces wedge the first set of rollers and driveably connect shaft 68 to the inner race 122, which is fixed to drum 96. When the inner race rotates counterclockwise relative to the intermediate race as viewed in FIG. 4, the rollers 130 are wedged against the inner surface 118 and the cam surfaces and driveably connect race 116 to the inner race 122. If intermediate race 116 rotates clockwise relative to the inner race, the coupling overruns. If inner race 122 rotates counterclockwise relative to the intermediate race, the coupling overruns.

The radially outer one-way coupling includes an outer race 136 having second cam surfaces 138 mutually spaced angularly about the axis. Each second cam surface is inclined in the opposite direction from that of the first cam surfaces. Cam surfaces 138, which may be planar or arcuate, are spaced radially from outer surface 120 sufficiently to permit a second set of cylindrical rollers 140 to fit between the outer surface 120 and cam surfaces 138. Each outer cam surface has a first angular end 144 spaced radially closer to intermediate race 116, end 144 corresponding to end 128 that is distant from race 116, and a second angular end 146 spaced radially farther from race 116, end 146 corresponding to end 126 that is closer to race 116. Each of the second set of rollers is retained and spaced angularly from other rollers by a cage 142, which permits full angular movement of the rollers relative to cam surfaces 138.

When the intermediate race counter-rotates relative to the outer race, the outer coupling overruns. When the intermediate race rotates clockwise relative to the outer race, the cam surfaces wedge the second set of rollers, which then driveably connect the intermediate and outer race.

Having described a preferred embodiment of my invention, what I claim and desire to secure by U.S. Letters Patent is:

1. In a multiple speed automatic transmission for an automotive vehicle having a power source for driving a load and a casing, a mechanism comprising:
   a planetary gear system comprising a sun gear, a ring gear, planet pinions meshing with the sun gear and ring gear, and a carrier rotatably supporting the planet pinions;
   connecting means driveably connected to a member of the planetary gear system;
   first brake means (88) for alternately holding against rotation and releasing the member of the planetary gear system that is connected to the connecting means;
   second brake means (90) disposed in parallel with the first brake means between the casing and the connecting means, for alternately holding against rotation and releasing the member of the planetary gear system that is connected to the connecting means; and
   a coupling for driveably connecting the connecting means alternately to the first brake means in a first directional sense and the second brake means in a second directional sense, comprising
      an intermediate race defining inner and outer surfaces,
      a first one-way coupling means having an inner race, one race of the group consisting of the intermediate race and the inner race having first cam surfaces spaced mutually radially, a first set of clutch elements contacting the first cam surfaces, for driveably connecting the intermediate race and the inner race in a first direction, and
      a second one-way coupling means having an outer race, one race of the group consisting of the intermediate race and the outer race having second cam surfaces spaced mutually radially, a second set of clutch elements contacting the outer surface and the second cam surfaces, for driveably connecting the intermediate race and the outer race in a second direction opposite that of the first direction.

2. The mechanism of claim 1 wherein the inner and outer surfaces are cylindrical and the inner race includes arcuate first cam surfaces directed toward the inner surface, and outer race includes arcuate second cam surfaces directed toward the outer surface, the inclination of the first and second cam surfaces being oppositely directed.

3. The mechanism of claim 1 wherein the inner and outer surfaces are cylindrical and the inner race and outer race include first and second cam surfaces, respectively, each first cam surface being inclined radially with respect to the inner surface in the opposite direction from that of second cam surfaces with respect to the outer surface.

4. In a multiple speed automatic transmission for an automotive vehicle having a power source for driving a load and a casing, a mechanism comprising:
   a planetary gear system comprising a sun gear, a ring gear, planet pinions meshing with the sun gear and ring gear, and a carrier rotatably supporting the planet pinions;
   connecting means driveably connected to a member of the planetary gear system;
   first brake means (88) for alternately holding against rotation and releasing the member of the planetary gear system that is connected to the connecting means;
   second brake means (90) disposed in parallel with the first brake means between the casing and the connecting means, for alternately holding against rotation and releasing the member of the planetary gear system that is connected to the connecting means; and
   a coupling for producing a rotary drive connection about an axis between members of a first set of components in a first rotary directional sense and a drive connection about said axis between members of a second set of components in a second rotary directional sense, comprising
      an intermediate race defining radially inner and outer surfaces,
      first one-way coupling means having an inner race and a first set of clutch elements located between the inner race and the inner surface, spaced mutually angularly about said axis, contacting the inner surface and the inner race, for driveably connecting the intermediate race and the inner race in a first rotary direction, and
      second one-way coupling means having an outer race and a second set of clutch elements located between the outer race and the outer surface, spaced mutually angularly about said axis, contacting the outer surface and the outer race, for driveably connecting the intermediate race and the outer race in a second rotary direction opposite that of the first rotary direction.

5. The mechanism of claim 4 wherein the inner and outer surfaces are cylindrical and the inner race and outer race include arcuate cam surfaces having centers offset from said axis.

6. The mechanism of claim 4 wherein the inner and outer surfaces are cylindrical and the inner race and outer race include cam surfaces inclined radially in opposite directions with respect to the inner and outer surfaces.

7. A coupling for producing a drive connection between members of a first set of components in a first rotary directional sense and a drive connection between members of a second set of components in a second rotary directional sense, comprising:

an intermediate race defining inner and outer surfaces;

a first one-way coupling means having an inner race, a first set of rollers contacting the inner surface and the inner race, for driveably connecting the intermediate race and the inner race in a first direction; and a second one-way coupling means having an outer race, a second set of rollers contacting the outer surface and the outer race, for driveably connecting the intermediate race and the outer race in a second direction opposite that of the first direction.

8. The coupling of claim 7 wherein the inner and outer surfaces are cylindrical and the inner race and outer race include arcuate cam surfaces having centers offset from said axis.

9. The coupling of claim 7 wherein the inner and outer surfaces are cylindrical and the inner race and outer race include cam surfaces inclined radially in opposite directions with respect to the inner and outer surfaces.

10. A coupling for producing a rotary drive connection about an axis between members of a first set of components in a first rotary directional sense and a drive connection about said axis between members of a second set of components in a second rotary directional sense, comprising:

an intermediate race defining radially inner and outer surfaces;

first one-way coupling means having an inner race and a first set of rollers located between the inner race and the inner surface, spaced mutually angularly about said axis, contacting the inner surface and the inner race, for driveably connecting the intermediate race and the inner race in a first rotary direction; and second one-way coupling means having an outer race and a second set of rollers located between the outer race and the outer surface, spaced mutually angularly about said axis, contacting the outer surface and the outer race, for driveably connecting the intermediate race and the outer race in a second rotary direction opposite that of the first rotary direction.

11. The coupling of claim 10 wherein the inner and outer surfaces are cylindrical and the inner race and outer race include arcuate cam surfaces having centers offset from said axis.

12. The coupling of claim 10 wherein the inner and outer surfaces are cylindrical and the inner race and outer race include cam surfaces inclined radially in opposite directions with respect to the inner and outer surfaces.

* * * * *